(12) United States Patent
Iwadate et al.

(10) Patent No.: US 10,719,569 B2
(45) Date of Patent: Jul. 21, 2020

(54) INFORMATION PROCESSING APPARATUS, SCREEN DISPLAYING SYSTEM, AND NON-TRANSITORY RECORDING MEDIUM HAVING STORING THEREIN PROGRAM

(71) Applicant: FUJITSU LIMITED, Kawasaki-shi, Kanagawa (JP)

(72) Inventors: Kota Iwadate, Numazu (JP); Kazuyoshi Watanabe, Tagata (JP); Toshiharu Makida, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/189,679

(22) Filed: Nov. 13, 2018

(65) Prior Publication Data
US 2019/0179968 A1   Jun. 13, 2019

(30) Foreign Application Priority Data
Dec. 12, 2017   (JP) .................................. 2017-237987

(51) Int. Cl.
*G09G 5/00* (2006.01)
*G06F 16/957* (2019.01)
*G09G 5/14* (2006.01)
*G06F 3/14* (2006.01)

(52) U.S. Cl.
CPC ........ *G06F 16/9574* (2019.01); *G06F 3/1446* (2013.01); *G06F 16/9577* (2019.01); *G09G 5/14* (2013.01)

(58) Field of Classification Search
CPC .............. G06F 3/1446; G06F 16/9574; G06F 16/9577; G09G 5/14
See application file for complete search history.

(56) References Cited

U.S. PATENT DOCUMENTS

| | | | | |
|---|---|---|---|---|
| 2003/0067418 A1* | 4/2003 | McClintock | .......... | G06F 1/1601 345/1.1 |
| 2010/0097294 A1* | 4/2010 | Kastrup | ................ | G06F 3/1446 345/1.3 |
| 2014/0355819 A1* | 12/2014 | Naruse | .................. | G06F 3/1423 382/103 |
| 2015/0187333 A1* | 7/2015 | Loeffler | ................ | G06F 3/1438 345/1.3 |
| 2016/0224306 A1* | 8/2016 | Rycyna, III | .............. | G09G 3/32 |

FOREIGN PATENT DOCUMENTS

JP          9-244993          9/1997

* cited by examiner

*Primary Examiner* — Charles Tseng
(74) *Attorney, Agent, or Firm* — Staas & Halsey LLP

(57) ABSTRACT

An information processing apparatus includes a storing device and a processor. The storing device stores associated segment information indicative of two or more display unit segments having common data forming display contents among a plurality of display unit segments included in a screen of the client terminal. The processor instructs, when an update occurs on the data forming the display contents on a first display unit segment among the plurality of display unit segments, the client terminal to update data forming the display contents to be displayed on a second display unit segment associated with the first display unit segment among the plurality of display unit segments by referring to the associated segment information stored in the storing device.

16 Claims, 20 Drawing Sheets

FIG. 18

| DATA ID | TARGET BLOCK(S) | BD OPERATION (GENERATE/ UPDATE/DELETE) | DATA ATTRIBUTE VALUE #1 | ... | DATA ATTRIBUTE VALUE #n |
|---|---|---|---|---|---|
| 1 | B,C | UPDATE | Value 1 | ... | Value n |

INFORMATION PROCESSING APPARATUS, SCREEN DISPLAYING SYSTEM, AND NON-TRANSITORY RECORDING MEDIUM HAVING STORING THEREIN PROGRAM

CROSS-REFERENCE TO RELATED APPLICATION

This application is based upon and claims the benefit of priority of the prior Japanese Patent application No. 2017-237987, filed on Dec. 12, 2017, the entire contents of which are incorporated herein by reference.

FIELD

The embodiment(s) discussed herein is directed to an information processing apparatus, a screen displaying system, and a non-transitory computer-readable recording medium having stored therein a program.

BACKGROUND

In general updating a screen of a WEB application, the entirety of data being displayed on the screen is reloaded and data after the updating is obtained.

The accompanying drawing FIG. 1 is a drawing illustrating a scheme of automatically updating a screen of a Web application.

Examples of automatically updating a screen are the following three schemes (1) to (3) illustrated in FIG. 1. The schemes (1) to (3) in FIG. 1 each display a Dashboard panel displaying a usage status and capability information of, for example, a storage device, and segment the screen into four blocks A-D.

The scheme (1) illustrated in FIG. 1 is a pull scheme in which the entirety of the screen being displayed (in other words, the entirety of displayed data) is periodically reloaded.

The scheme (2) illustrated in FIG. 1 is a pull scheme in which the displayed data is reloaded in units of blocks at respective reloading intervals determined by considering a frequency of updating of each block of the displayed data.

The scheme (3) illustrated in FIG. 1 is a push scheme in which the server transmits the updated data to the client terminal and each updated block is reloaded. The number of times of reloading is increased for data having a high updating frequency to increase the Input/Output (I/O) load as compared to the pull schemes. Therefore, the scheme (3) of FIG. 1 is suitable for reloading data having a low updating frequency.

[Patent Literature 1] Japanese Laid-open Patent Publication No. HEI 9-244993

However, the scheme (1) of FIG. 1 reloads a screen displaying there on data not updated and has a possibility of transferring also non-updated data.

Although reducing an amount of transferred non-updated data as compared to the scheme (1) of FIG. 1, the scheme (2) of FIG. 1 does not completely transfer non-updated data.

The scheme (3) of FIG. 1 transfers updated data from the server to the client terminal, and reloads the transferred updated data, and therefore has no possibility of transferring non-updated data.

However, the scheme (3) of FIG. 1 has a possibility of transferring updated data of a block not being currently displayed on the screen.

The accompanying drawing FIG. 2 is a diagram illustrating a problem of the scheme (3) of FIG. 1.

As illustrated in FIG. 2, in cases where the data 1 on the block B of the display screen is updated and the block B is reloaded, the block D, which has a dependent relationship with the block B because both blocks B and D have the data 1, may not be updated. This causes inconsistency of data between the block B and the block D.

SUMMARY

According to an aspect of the embodiment, an information processing apparatus connected to a client terminal, the information processing apparatus includes: a storing device configured to store associated segment information indicative of two or more display unit segments having common data forming display contents among a plurality of display unit segments included in a screen of the client terminal; and a processor configured to instruct, when an update occurs on the data forming the display contents on a first display unit segment among the plurality of display unit segments, the client terminal to update data forming the display contents to be displayed on a second display unit segment associated with the first display unit segment among the plurality of display unit segments by referring to the associated segment information stored in the storing device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 18 is a diagram illustrating an example of a reload data list of a screen displaying system of FIG. 3;

DESCRIPTION OF EMBODIMENT(S)

Hereinafter, description will now be made in relation to an embodiment with reference to the accompanying drawings. The following embodiment is exemplary, and does not have intention to exclude various modifications and applications of techniques not mentioned in the embodiment. In other words, various changes and modifications can be suggested without departing from the scope of the embodiment.

The drawings do not illustrate therein all the functions and elements included in the embodiment, and may include additional functions and elements to those illustrated in the accompanying drawings.

Throughout the drawings, like reference numbers designate the same or substantially the same parts and elements, so repetitious description is omitted here.

(A) Example of Embodiment (A-1) Example of a System Configuration

Figure 1:
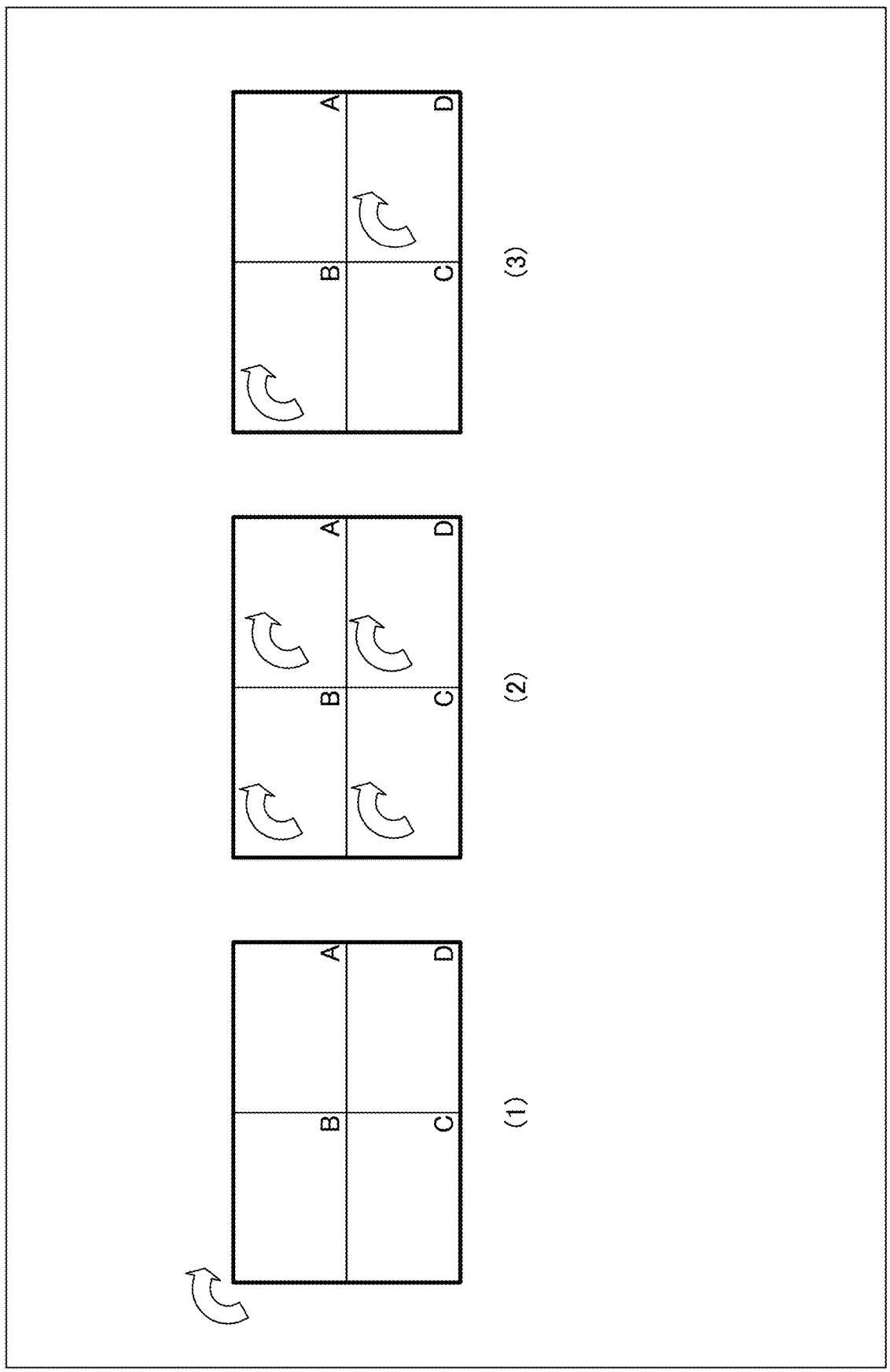
FIG. 1 is a diagram illustrating a scheme of automatically updating a screen of a Web application.
Figure 2:
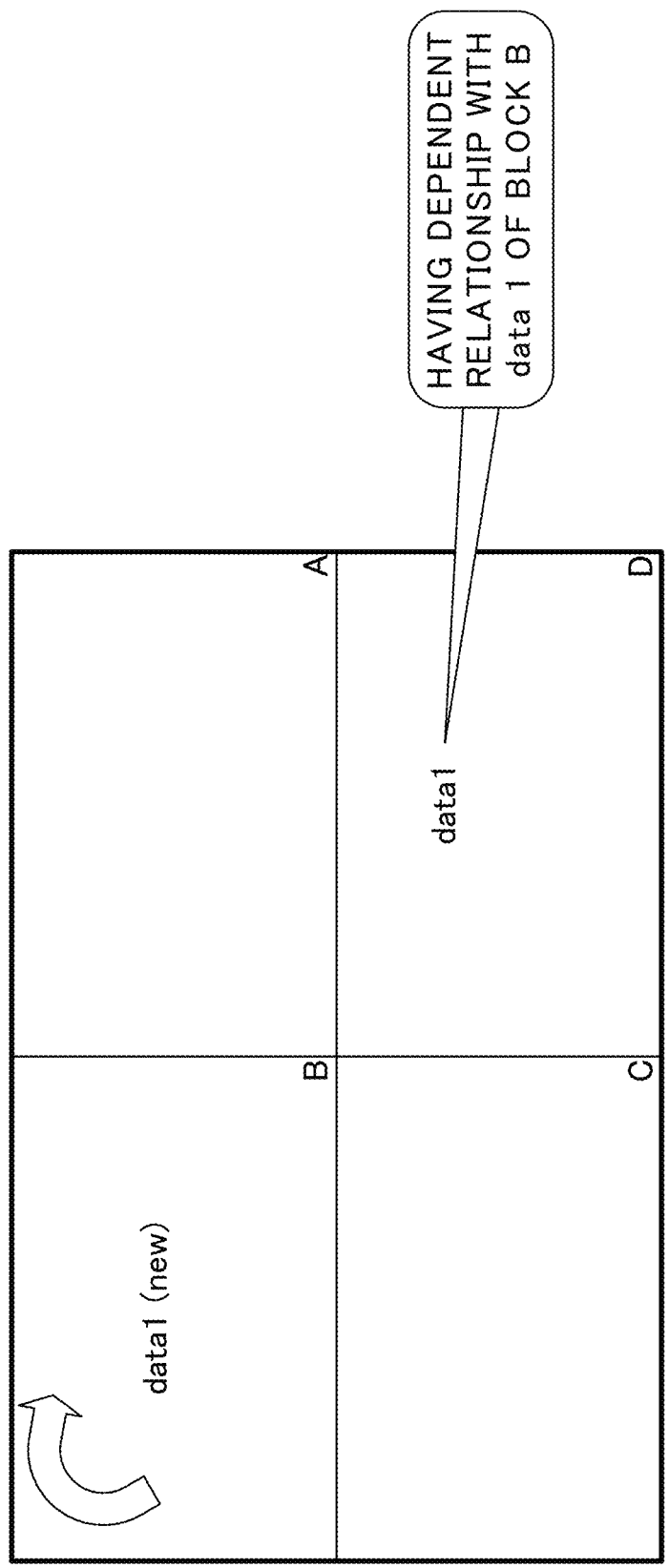
FIG. 2 is a diagram illustrating a problem of the scheme (3) of FIG. 1.
Figure 3:
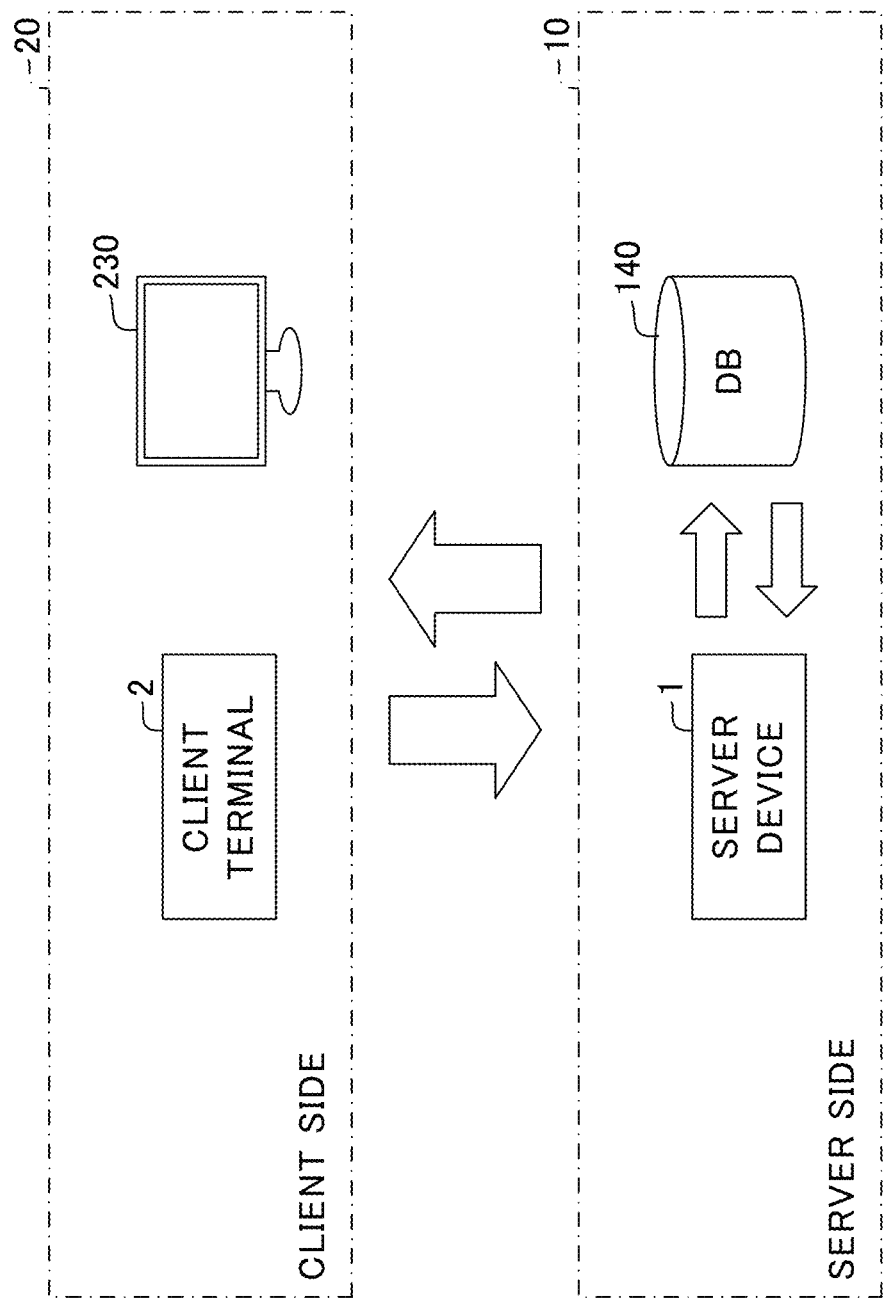
FIG. 3 is a block diagram schematically illustrating the configuration of a screen displaying system according to an embodiment.

FIG. 3 is a block diagram schematically illustrating the configuration of a screen displaying system 100 of an example of an embodiment.

The screen displaying system 100 is divided into a server side 10 and a client side 20.

The server side 10 exemplarily includes a server device 1 and a database (DB) 140. The server device 1 is an example of an information processing apparatus and is a computer having a server function. The DB 140 stores various pieces of data to be provided to the client side 20.

The client side 20 exemplarily includes a client terminal 2 and a monitor 230. The client terminal 2 is provided with data from the server side 10. The monitor 230 is an example of a display unit, and displays thereon data that the client terminal 2 received for the user.

Figure 4:
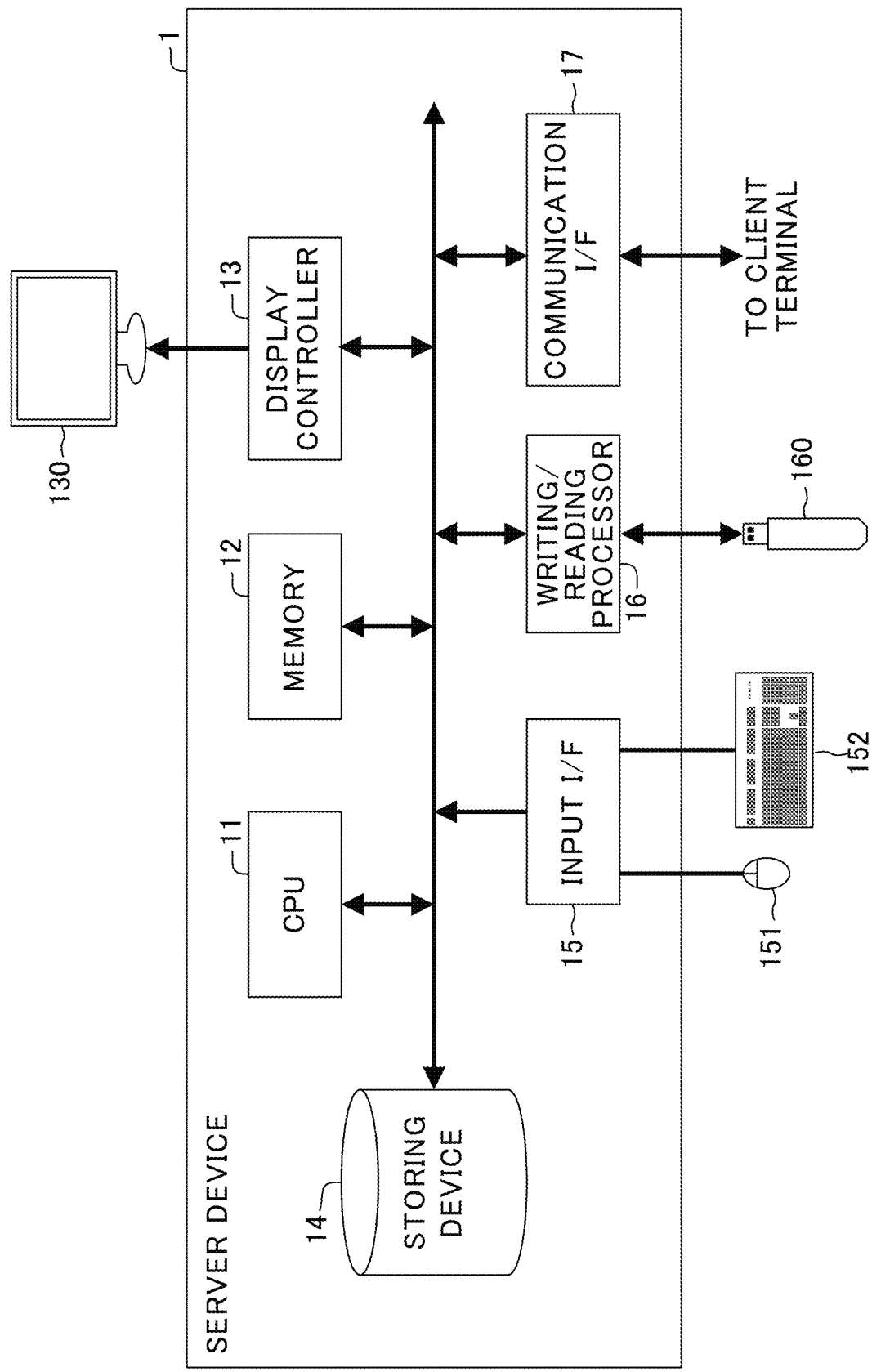
FIG. 4 is a block diagram schematically illustrating the hardware configuration of a server device of FIG. 3.

FIG. 4 is a block diagram schematically illustrating the hardware configuration of the server device 1 of FIG. 3.

The server device 1 includes a Central Processing Unit (CPU) 11, a memory 12, a display controller 13, a storing device 14, an input interface (I/F) 15, a writing/reading processor 16, and a communication I/F 17.

The memory 12 is exemplarily a storing device including a Read Only Memory (ROM) and a Random Access Memory (RAM). Into the ROM of the memory 12, a program such as a Basic Input/Output System (BIOS) may be written. A software program in the memory 12 may be appropriately read and executed by the CPU 11. The RAM of the memory 12 may be used as a primary recording memory or a working memory.

The display controller 13 is connected to the monitor 130 and controls the monitor 130. Examples of the monitor 130 are an LCD, an Organic Light-Emitting Diode (OLED) display, a Cathode Ray Tube (CRT) display, and an electronic paper display. The monitor 130 displays thereon various types of information to, for example, the operator. The monitor 130 may be combined with an input device and may be exemplified by a touch panel. Multiple monitors 130 may be connected to the display controller 13.

The storing device 14 is an example of a storing device, and is a device that readably and writably stores data. Examples of the storing device 14 are a Hard Disk Drive (HDD), a Solid State Drive (SSD), and a Storage Class Memory (SCM). The storing device 14 constructs the DB 140 illustrated in FIG. 3.

The input I/F 15 is connected to an input device such as a mouse 151 and a keyboard 152, and controls the input device such as the mouse 151 and the keyboard 152. The mouse 151 and the keyboard 152 are examples of an input device through which the operator makes various inputs.

The writing/reading processor 16 is configured to be able to mount a recording medium 160 thereon. The writing/reading processor 16 is configured to be capable of reading information recorded in the recording medium 16 under a state where the recording medium 160 is mounted on the writing/reading processor 16. In this example, the recording medium 160 is portable. Examples of the recording medium 160 are a flexible disk, an optical disk, a magnetic disk, a magneto-optical disk, and a semiconductor memory.

The communication I/F 17 is an interface that makes the server device 1 possible to communicate with an external device (in other words, the client terminal 2).

Figure 5:
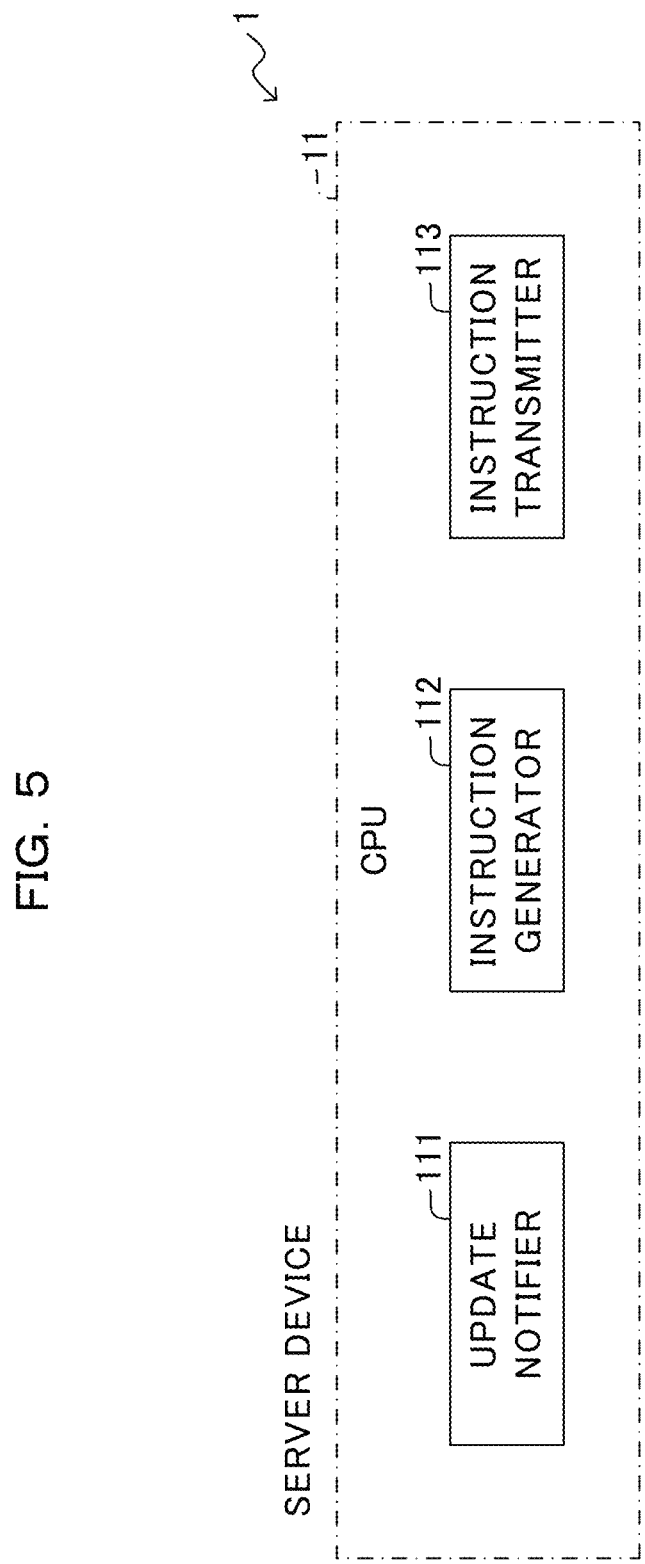
FIG. 5 is a block diagram schematically illustrating the functional configuration of a server device of FIG. 4.

FIG. 5 is a block diagram schematically illustrating the functional configuration of the server device 1 illustrated in FIG. 4.

The CPU 11 is a processor that carries out various controls and calculations, and achieves various functions by executing the Operating System (OS) and programs stored in the memory 12. Specifically, as illustrated in FIG. 5, the CPU 11 of the server device 1 functions as an update notifier 111, an instruction generator 112, and an instruction transmitter 113.

The program to achieve the functions as the update notifier 111, the instruction generator 112, and the instruction transmitter 113 is provided, for example, in the form of being recorded in the above-described recording medium 160. The computer reads the program from the recording medium 160 through the writing/reading processor 16, and transfers the read program to an internal or external storing device to store therein for future use. Otherwise, the program may be recorded in a storing device (recording medium) such as a magnetic disk, an optical disk, or a magneto-optical disk, and be provided from the storing device to the computer through a communication path.

In achieving the functions of the update notifier 111, the instruction generator 112, and the instruction transmitter 113, the program stored in the internal storing device (in this embodiment, the memory 12) is executed by the microprocessor (CPU 11 of the present embodiment) of the computer. Alternatively, the computer may read and execute the program recorded in the recording medium 160.

The CPU 11 exemplarily controls the overall operation of the server device 1. The device to control the overall operation of the server device 1 is not limited to the CPU 11, and may alternatively be either one of a Micro Processing Unit (MPU), a Digital Signal Processor (DSP), an Application Specific Integrated Circuit (ASIC), a Programmable Logic Device (PLD), and a Field Programmable Gate Array (FPGA). Further alternatively, the device to control the overall operation of the server device 1 may be a combination including two or more of a CPU, an MPU, a DSP, an ASIC, a PLD, and an FPGA.

The update notifier 111 detects an update on data occurring in the DB 140, and notifies the instruction generator 112 of the detected update of the data.

The instruction generator 112 generates an instruction on an update of data to the client terminal 2.

The instruction transmitter 113 transmits the instruction generated by the instruction generator 112 to the client terminal 2.

The detailed functions of the update notifier 111, the instruction generator 112, and the instruction transmitter 113 will be described below with reference to, for example, FIG. 9.

Figure 6:
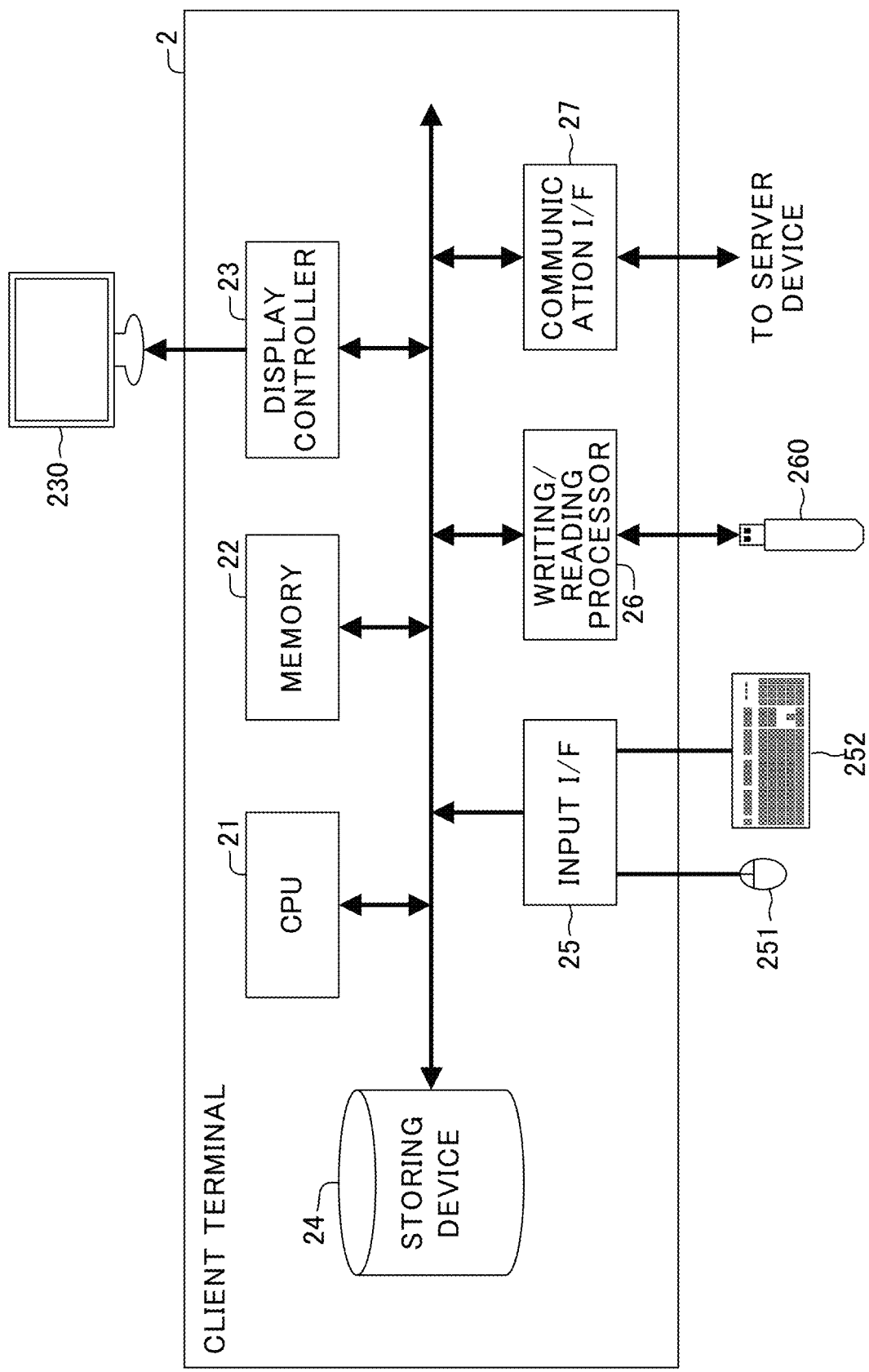
FIG. 6 is a block diagram schematically illustrating the hardware configuration of a client terminal of FIG. 3.

FIG. 6 is a block diagram schematically illustrating the hardware configuration of the client terminal 2 of FIG. 3.

The client terminal 2 includes a CPU 21, a memory 22, a display controller 23, a storing device 24, an input I/F 25, a writing/reading processor 26, and a communication I/F 27.

The memory 22 is exemplarily a storing device including a ROM and a RAM. Into the ROM of the memory 22, a program such as a BIOS may be written. A software program in the memory 22 may be appropriately read and extracted by the CPU 21. The RAM of the memory 22 may be used as a primary recording memory or a working memory.

The display controller 23 is connected to the monitor 230 and controls the monitor 230. Examples of the monitor 230 are an LCD, an OLED display, a CRT display, and an electronic paper display. The monitor 230 displays thereon various types of information to, for example, the operator. The monitor 230 may be combined with an input device and may be exemplified by a touch panel. Multiple monitors 230 may be connected to the display controller 23. The monitor 230 displays thereon a Web application screen (to be described blow with reference to, for example, FIG. 8) based on data obtained from the server device 1.

The storing device 24 is a device that readably and writably stores data. Examples of the storing device 24 may be a HDD, an SSD, and an SCM.

The input I/F 25 is connected to an input device such as a mouse 251 and a keyboard 252, and controls the input device such as the mouse 251 and the keyboard 252. The mouse 251 and the keyboard 252 are examples of an input device through which the operator makes various inputs.

The writing/reading processor 26 is configured to be able to mount a recording medium 260 thereon. The writing/reading processor 26 is configured to be capable of reading information recorded in the recording medium 26 under a state where the recording medium 260 is mounted on the writing/reading processor 26. In this example, the recording medium 260 is portable. Examples of the recording medium 260 are a flexible disk, an optical disk, a magnetic disk, a magneto-optical disk, and a semiconductor memory.

The communication I/F 27 is an interface that makes the client terminal 2 possible to communicate with an external device (in other words, the server device 1).

Figure 7:
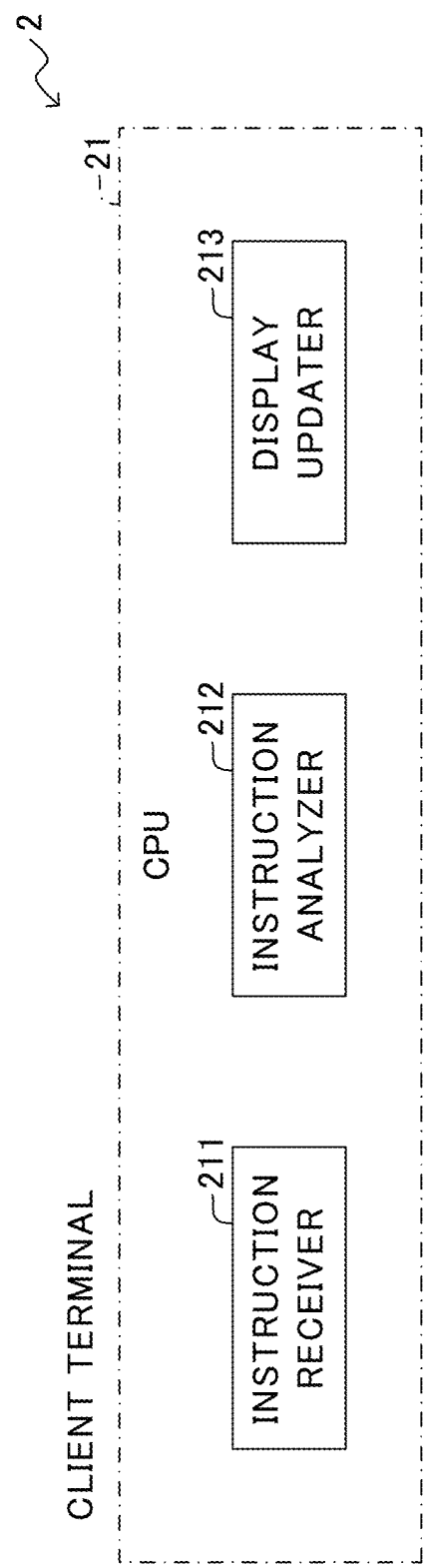
FIG. 7 is a block diagram schematically illustrating the functional configuration of a client terminal of FIG. 6.

FIG. 7 is a block diagram schematically illustrating the functional configuration of the client terminal 2 illustrated in FIG. 6.

The CPU 21 is a processor that carries out various controls and calculations, and achieves various functions by executing the OS and programs stored in the memory 22. Specifically, as illustrated in FIG. 7, the CPU 21 of the client terminal 2 functions as an instruction receiver 211, an instruction analyzer 212, and a display updater 213.

The program to achieve the functions as the instruction receiver 211, the instruction analyzer 212, and the display updater 213 is provided, for example, in the form of being recorded in the above-described recording medium 260. The computer reads the program from the recording medium 260 through the writing/reading processor 26, and transfers the read program to an internal or external storing device to store therein for future use. Otherwise, the program may be recorded in a storing device (recording medium) such as a magnetic disk, an optical disk, or a magneto-optical disk, and be provided from the storing device to the computer through a communication path.

In achieving the functions of the instruction receiver 211, the instruction analyzer 212, and the display updater 213, the program stored in the internal storing device (in the present embodiment, the memory 22) is executed by the microprocessor (in the present embodiment CPU 21) of the computer. Alternatively, the computer may read and execute the program recorded in the recording medium 260.

The exemplarily CPU 21 controls the overall operation of the client terminal 2. The device to control the overall operation of the client terminal 2 is not limited to the CPU 21, and may alternatively be either one of an MPU, a DSP, an ASIC, a PLD, and an FPGA. Further alternatively, the device to control the overall operation of the client terminal 2 may be a combination including two or more of a CPU, an MPU, a DSP, an ASIC, a PLD, and an FPGA.

The instruction receiver 211 receives an instruction transmitted by the server device 1.

The instruction analyzer 212 analyzes the instruction received by the instruction receiver 211.

The display updater 213 updates the display on the monitor 230 on the basis of the result of the analysis by the instruction analyzer 212.

The detailed functions of the instruction receiver 211, the instruction analyzer 212, and the display updater 213 will be described below with reference to, for example, FIG. 10.

Figure 8:
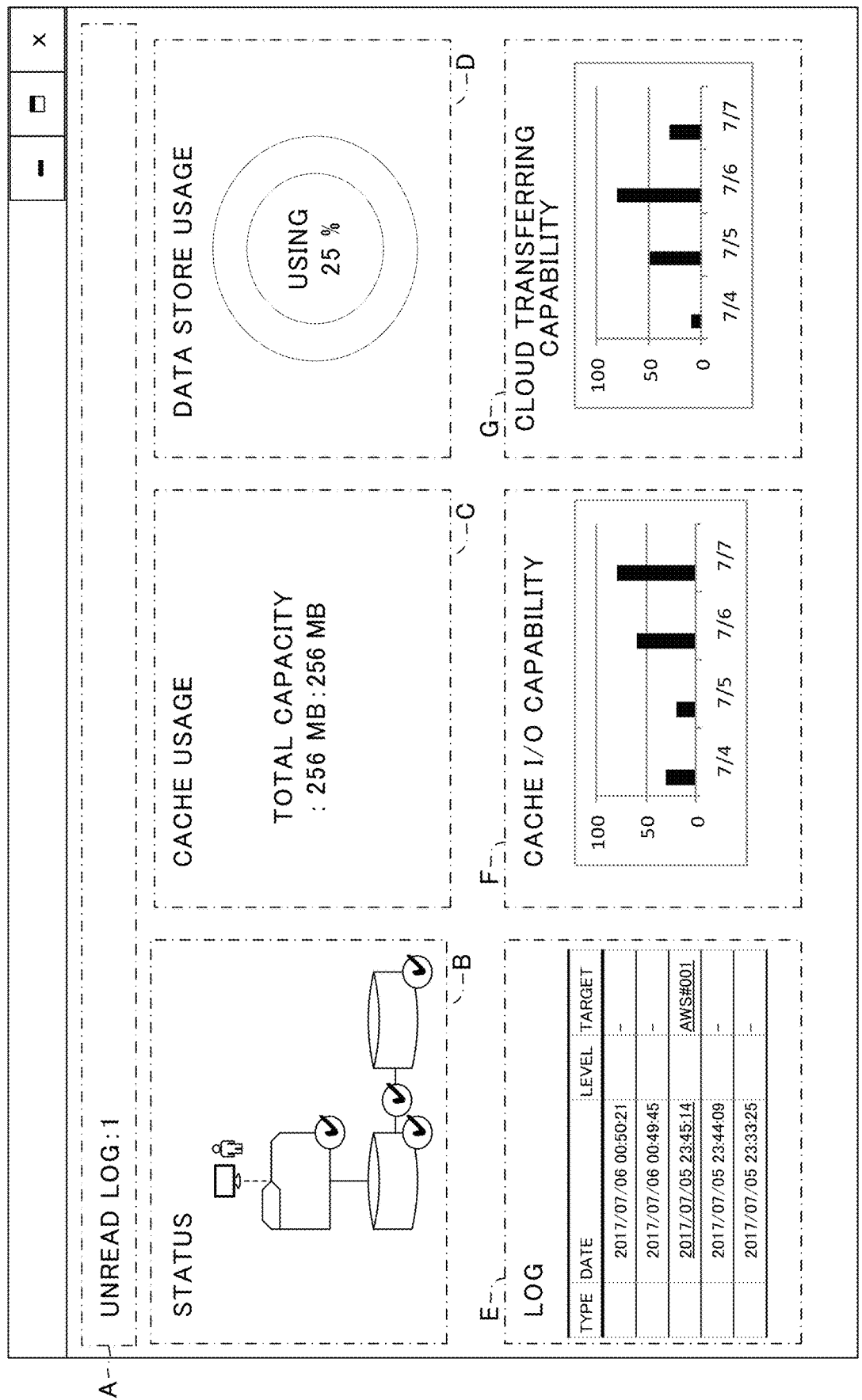
FIG. 8 is a diagram illustrating an example of screen display of a client terminal of FIG. 6.

FIG. 8 is a diagram illustrating an example of a screen display on the client terminal 2 illustrated in FIG. 6.

A Web application of FIG. 8 indicates the panel of the "Dashboard", which displays the using status and performance information of a storage device or the like on the monitor 230 of the client terminal 2. In the example of FIG. 8, the screen displaying the Web application is segmented into seven blocks A to G (also referred to as "display unit segments"). In cases where multiple monitors 230 are connected to the client terminal 2 illustrated in FIG. 6, the blocks A-G may be displayed on two or more of the monitors 230 in parts.

In the example of FIG. 8, the block A indicates the number of unread logs; the block B indicates the stats of the system; the block C indicates the cache usage; the block D indicates the data store usage; and the block E indicates the list of the logs; the block F indicates the cache Input/Output (I/O) capability; and the block G indicates the cloud transferring capacity.

In the example of FIG. 8, an unread log in the list displayed on the block E is turned to "already read", and then the number of unread logs on the block A is reduced. This means that in cases where an unread log in the list displayed on the block E is turned to already read but the number of unread logs on the block A is not updated, inconsistency is caused between the block A and the block E.

The example of the present embodiment refers to an associated block table 141 (to be detailed below with reference to, for example, FIG. 9) which records one or more blocks associated with each of the blocks constituting the display screen. In reloading the display screen, the blocks associated with an updated block are also reloaded.

Figure 9:
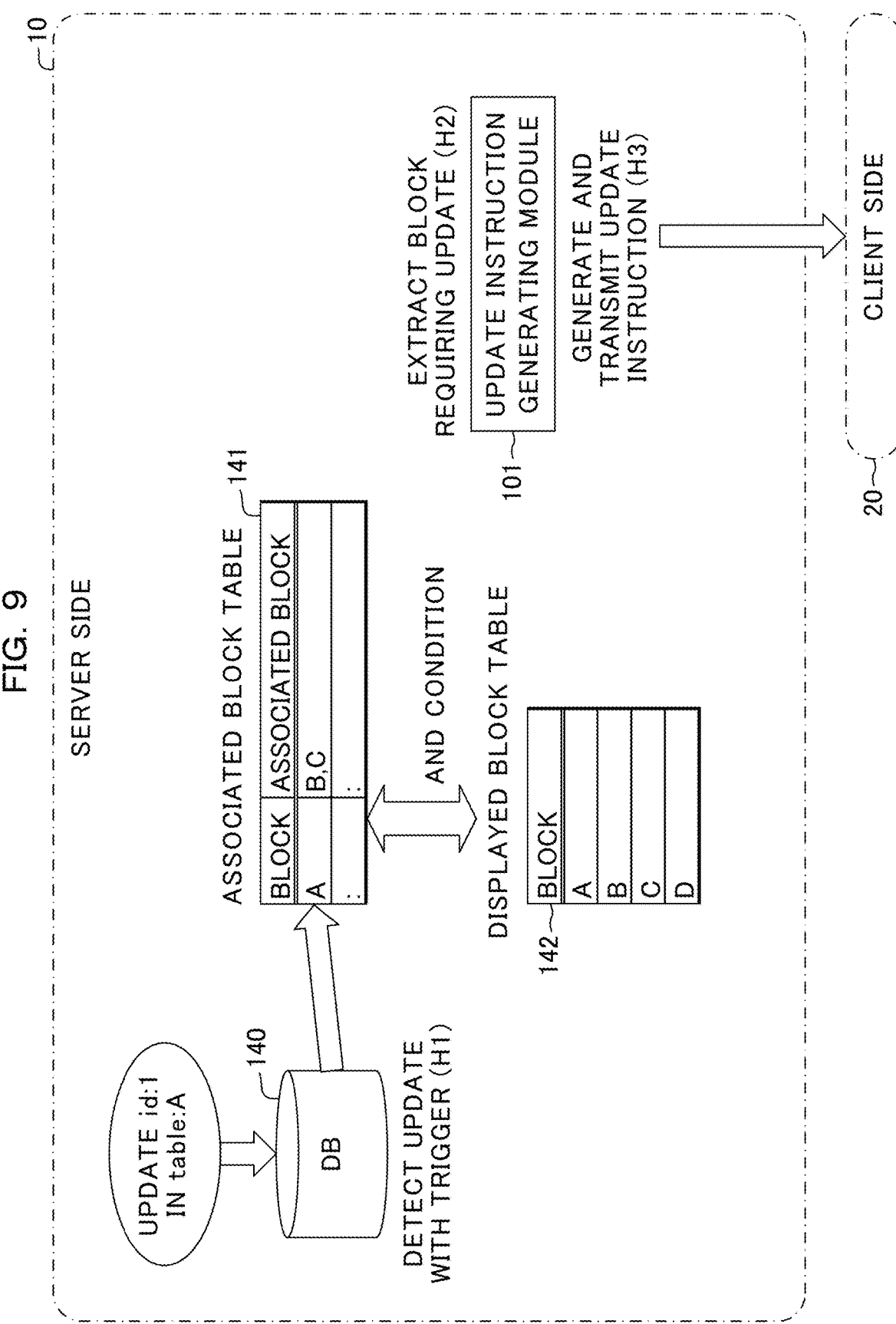
FIG. 9 is a diagram illustrating an example of a screen updating process on a server side of a screen displaying system of FIG. 3.

FIG. 9 is a diagram illustrating an example of a screen updating process on the server side 10 in the screen displaying system 100 illustrated in FIG. 3.

An update instruction generating module 101 illustrated in FIG. 9 corresponds to the instruction generator 112 of FIG. 5.

The update notifier 111 detects an update, using an update of data in the DB 140 as a trigger (see the reference number H1 of FIG. 9), and notifies the update instruction generating module 101 of the update. In the example of FIG. 9, the update notifier 111 notifies the update instruction generating module 101 that the data represented by "id:1" in table:A corresponding to the block A has been updated.

The update instruction generating module 101 extracts one or more blocks associated with the block updated in the DB 140 by referring to to the associated block table 141.

The associated block table 141 is stored as the associated segment information in the storing device 14, and has columns of "block" and "associated block". This means that the storing device 14 stores the associated segment information indicative of two or more blocks having common data forming display contents among multiple blocks included in a screen of the client terminal 2. The "associated block" column is indicative of one or more blocks associated with the block registered in the "block" column. In the example of FIG. 9, the block A has the associated blocks B and C.

The update instruction generating module 101 obtains an AND condition between the displayed block table 142 and associated block table 141 by referring to the displayed block table 142. The update instruction generating module 101 extracts a block registered in the "block" column or the "associated block" column of the associated block table 141 and also registered in the "block" column of the displayed block table 142 to be a block need to be updated (see the reference number H2 in FIG. 9).

The displayed block table 142 is stored as display segment information in the storing device 14, and registers therein one or more blocks being currently displayed on the monitor 230 of the client terminal 2. This means that the storing device 14 further stores the display segment information indicative of one or more blocks being displayed on the screen among the multiple blocks. In the example of FIG. 9, the blocks A-D are currently being displayed on the monitor 230 of the client terminal 2. In the example of FIG. 9, the blocks A-C registered both in the associated block table 141 and the displayed block table 142 are extracted to be blocks to be updated.

The update instruction generating module 101 generates an update instruction (may also be referred to as a "reload instruction") on the blocks A-C, and the instruction transmitter 113 transmits the generated update instruction to the client side 20 (see the reference number H3 in FIG. 9). An update instruction to be generated and transmitted will be detailed below with reference to FIG. 18.

Specifically, in cases where an update occurs in the data forming the display contents on a first block, the instruction generator 112 instructs the client terminal 2 to update the data forming the display contents on a second block associated with the first block on the basis of the associated segment information stored in the storing device 14. In addition, the instruction generator 112 instructs the client terminal 2 to update the data forming the display contents on the second block being displayed on the screen on the basis of the display segment information stored in the storing device 14.

Figure 10:
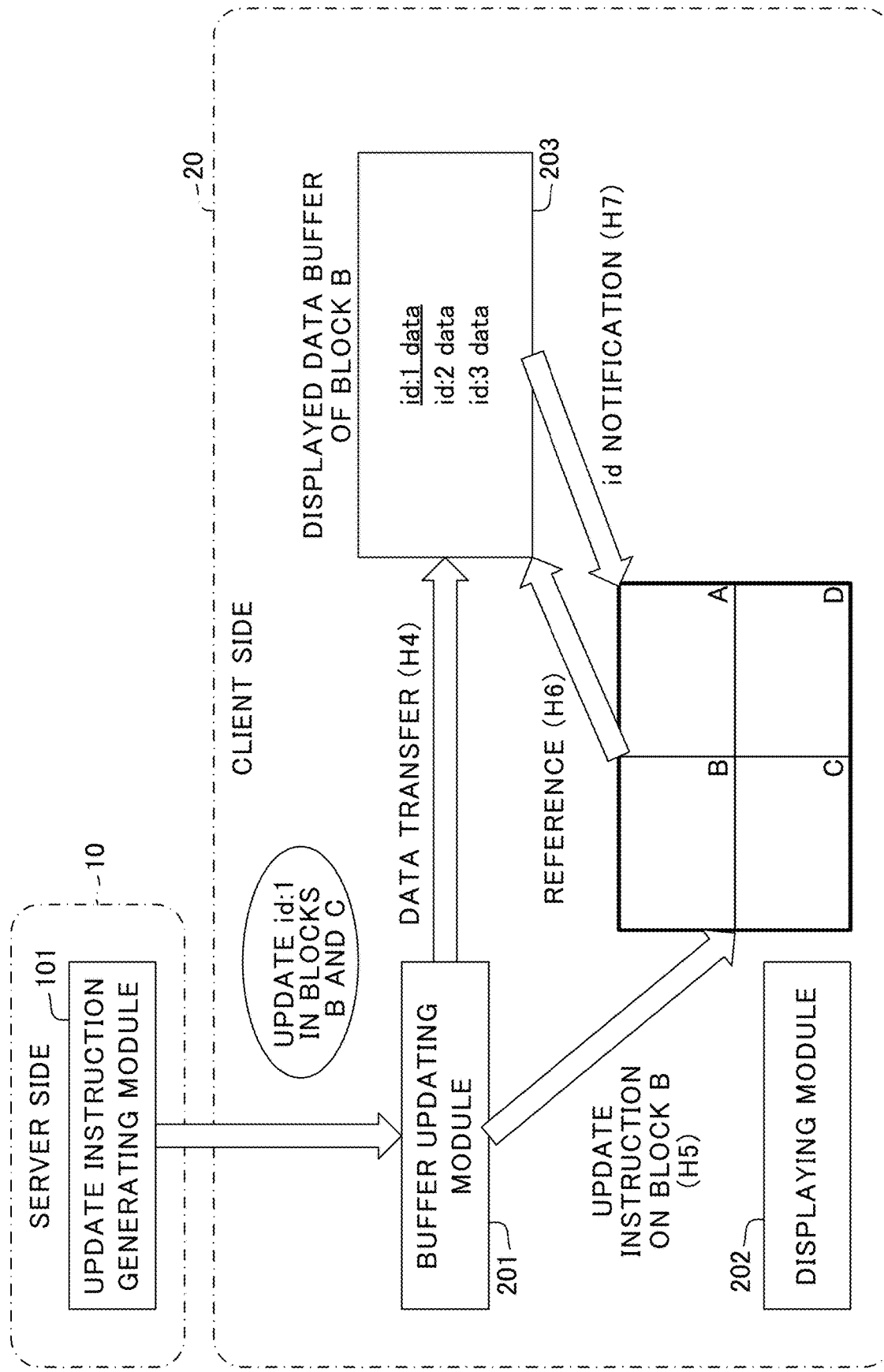
FIG. 10 is a diagram illustrating an example of a screen updating process on a client side of a screen displaying system of FIG. 3.

FIG. 10 is a diagram illustrating an example of a screen updating process on the client side 20 of the screen displaying system 100 illustrated in FIG. 3.

The instruction receiver 211 is an example of a receiver, and receives an update instruction from the server side 10. In the example of FIG. 10, the instruction receiver 211 receives an update instruction to update data represented by id:1 in the blocks B and C in addition to the block A updated in the DB 140.

Specifically, in cases where an update occurs in the data forming the display contents on the first block, the instruction receiver 211 receives, from the server device 1, an instruction to update the data forming the display contents displayed on the second block associated with the first block on the basis of the associated segment information indicative of one or more blocks having common data forming the display contents.

The data updating process to be performed on the blocks A-C are the same as one another. The following description is limited to the data updating process only on the block B, and description of the data updating process on the blocks A and C is omitted here.

A buffer updating module 201 illustrated in FIG. 10 corresponds to the instruction analyzer 212 of FIG. 7.

The buffer updating module 201 analyzes an update instruction received by the instruction receiver 211, extracts prospective data to be displayed after the updating contained in the update instruction, and transfers the prospective data to the displayed data buffer 203 of the block B (see the reference number H4 of FIG. 10). Here, displayed data buffers 203 are provided one for each of the blocks constituting the display screen, and buffer data being displayed on the respective corresponding blocks. In the example of FIG. 10, data of id:1 in the displayed data buffer 203 of the block B is updated (see underlined part).

The buffer updating module 201 issues an update instruction on the block B to the display updater 213 (see the reference number H5 in FIG. 10).

A displaying module 202 illustrated in FIG. 10 corresponds to the display updater 213 of FIG. 7.

The displaying module 202 is an example of a second processor, and refers to the displayed data buffer 203 of the block B in order to update data id:1 of the block B in compliance with the update instruction from the instruction analyzer 212 (see the reference number H6 in FIG. 10).

The displaying module 202 receives a notification of prospective data of id:1 to be displayed after the forthcoming update from the displayed data buffer 203 of the block B, and updates the screen display of the block B (see the reference number H7 of FIG. 10).

Specifically, the display updater 213 updates displaying of data forming the display contents on the second block in addition to updating of the data forming the display contents on the first block on the basis of the received instruction.

Figure 11:
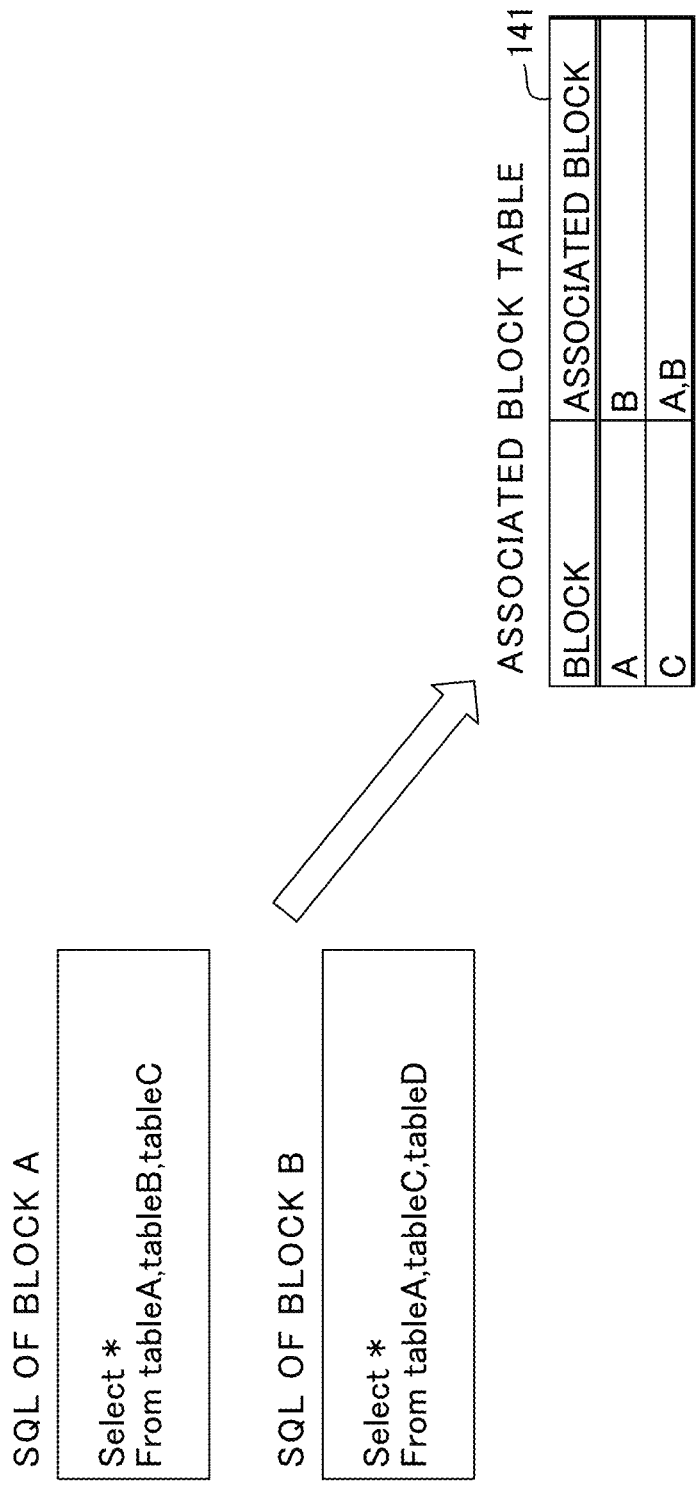
FIG. 11 is a diagram illustrating an example of a generating process of an associated block table in a screen displaying system of FIG. 3.

FIG. 11 is a diagram illustrating an example of a generating process of the associated block table 141 in the screen displaying system 100 of FIG. 3.

The instruction generator 112 generates the associated block table 141 from an SQL statement of each block.

Specifically, the instruction generator 112 retrieves a block referred by the FROM clause of each SQL statement.

In the example of FIG. 11, the block A (in other words, table A) is referred to by the block A itself and the block B, and the block C (in other words, table C) is referred to by the blocks A and B. Consequently, in the associated block table 141, the associated block with the block A is the block B, and the associated blocks with the block C are the blocks A and B.

Figure 12:
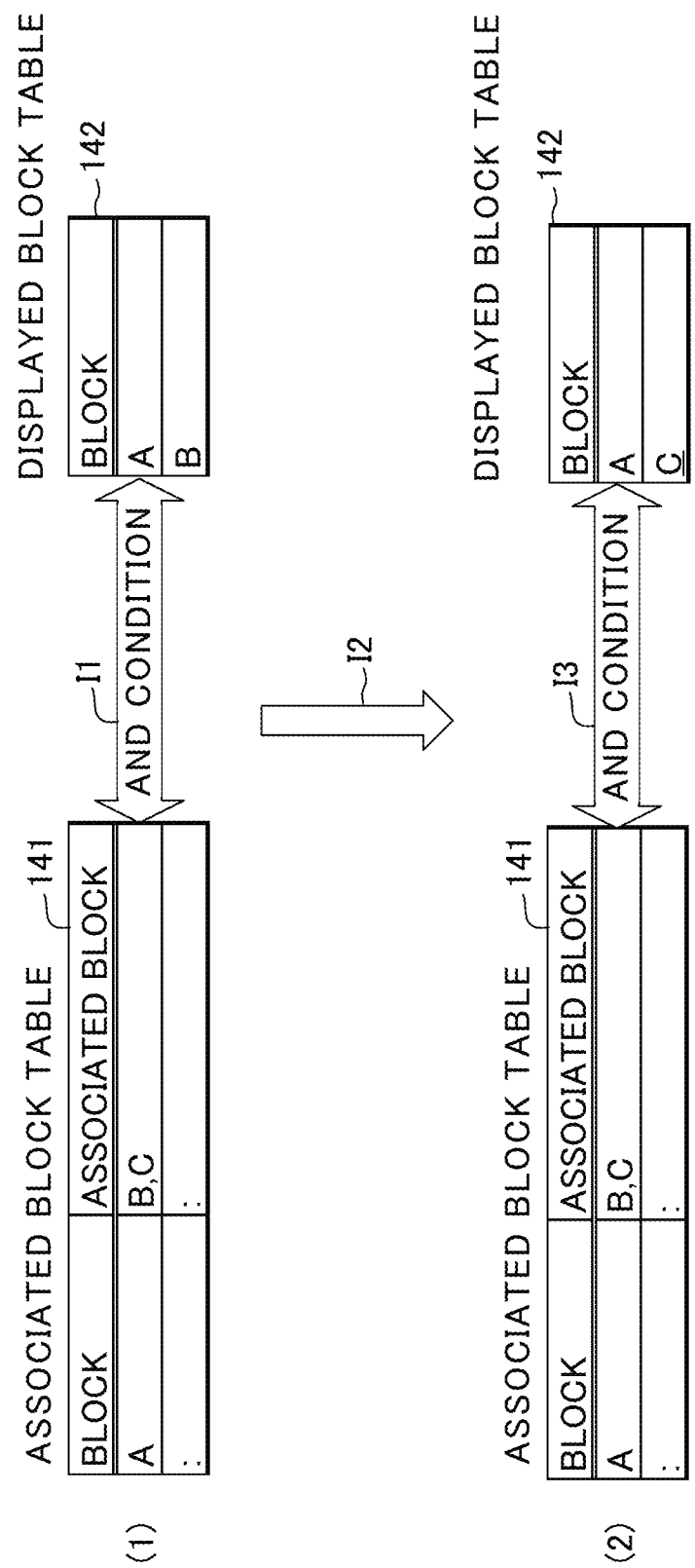
FIG. 12 is diagram illustrating a process carried out when a displayed block is changed in a screen displaying system of FIG. 3.

FIG. 12 is a diagram illustrating a process carried out when a displayed block is changed in the screen displaying system 100 illustrated in FIG. 3.

In the example of FIG. 12, an examination will now be made on a case where an update occurs in the block A.

As illustrated in (1) of FIG. 12, the blocks B and C are registered as the associated blocks with the block A in the associated block table 141. Furthermore, the blocks A and B are registered as the displayed blocks in the displayed block table 142.

The instruction generator 112 obtains an AND condition between the associated block table 141 and the displayed block table 142, and recognizes the blocks A and B as blocks to be updated (see the reference number I1 of FIG. 12). Then the instruction generator 112 generates update instructions on the blocks A and B.

Here, it is assumed that screen transition occurs on the display screen of the client terminal 2 (see the reference number I2). In this assumption, the block B on the display screen of the client terminal 2 is changed to the block C, and the displayed block in the displayed block table 142 is changed to the block A and the block C.

The instruction generator 112 obtains an AND condition between the associated block table 141 and the displayed block table 142 and thereby recognizes the blocks A and C as updating target blocks (see the reference number I3 of FIG. 12). Then the instruction generator 112 generates an update instruction on the block C, which is newly displayed as a result of the screen transition.

This means that, in cases where a third block is newly displayed on the screen and also a first block and the third block have common data forming the respective displaying contents, the instruction generator 112 instructs the client terminal 2 to update the data forming the display contents on the third block.

Figure 13:
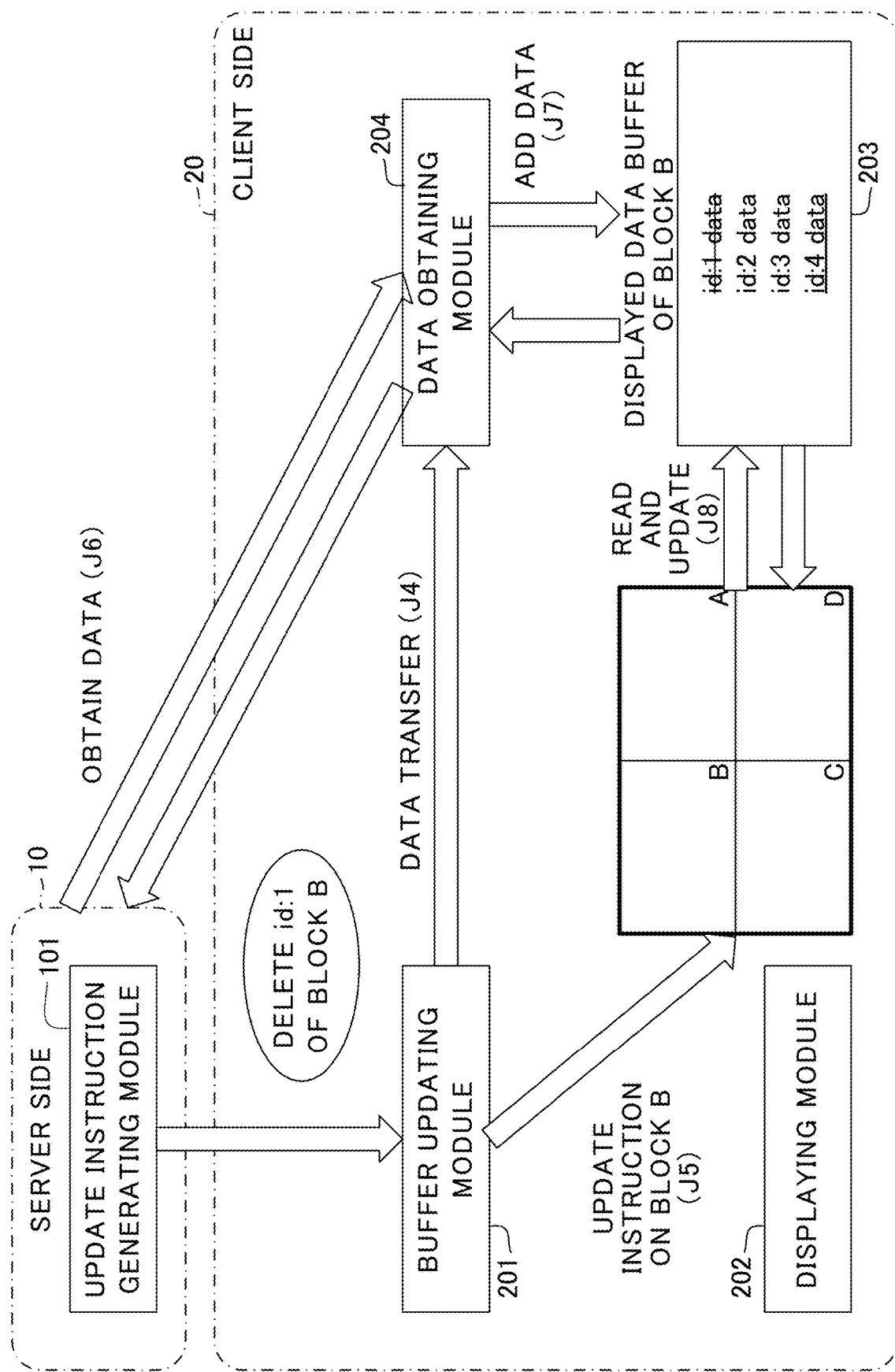
FIG. 13 is a diagram illustrating an example of a screen updating process when data is to be deleted in a screen displaying system of FIG. 3.

FIG. 13 is a diagram illustrating an example of a screen updating process when data is to be deleted in the screen displaying system 100 of FIG. 3. The process illustrated in FIG. 13 is the subsequent process to the processes indicated by the reference numbers H1-H3 in FIG. 9.

A buffer updating module 201 and a data obtaining module 204 illustrated in FIG. 13 correspond to the instruction analyzer 212 of FIG. 7. In addition, a displaying module 202 illustrated in FIG. 13 corresponds to the display updater 213 illustrated in FIG. 7.

The buffer updating module 201 analyzes the update instruction received from the server side 10, extracts an instruction to delete the data represented by id:1 of the block B included in the update instruction, and transmits prospective data to be displayed after the forthcoming update to the data obtaining module 204 (see the reference number J4 of FIG. 13).

The buffer updating module 201 issues an update instruction on the block B to the displaying module 202 (see the reference number J5 in FIG. 13).

The data obtaining module 204 obtains additional data to be registered into the displayed data buffer 203 of the block B in place of data id:1 to be deleted from the block B (see the reference number J6). In the example of FIG. 13, the data obtaining module 204 obtains data of id:4 in place of the data of id:1 in the block B, and adds the data id:4 to the displayed data buffer 203.

Namely, in cases where an update to delete a part of the data in the second block occurs, the instruction analyzer 212 receives data forming the display contents to be newly displayed on the second block from the server device 1.

The data obtaining module 204 deletes the data id:1 from the displayed data buffer 203 of the block B (see the strikethrough in the drawing), and also adds the data id:4, which is obtained from the server side 10, into the same displayed data buffer 203 (see the underline in the drawing) (see the reference number J7 of FIG. 13).

The displaying module 202 is an example of a second processor and reads the data stored in the displayed data buffer 203 of the block B in preparation for deleting the data id:1 on the block B in compliance to the update instruction from the instruction analyzer 212. Then the display updater 213 receives a notification of the data id:4, which is to be added in place of the data id:1, from the displayed data buffer 203 of the data B, and updates the screen display on the block B (see the reference number J8 in FIG. 13).

Consequently, the display updater 213 displays the data forming the display contents to be newly displayed, which data is received from the server device 1, on a second block B.

In an update to add new data (may also referred to as a "record") to the list, a row is added to a predetermined position on the screen and the subsequent data is discarded if required.

(A-2) Example of Operation

Figure 14:
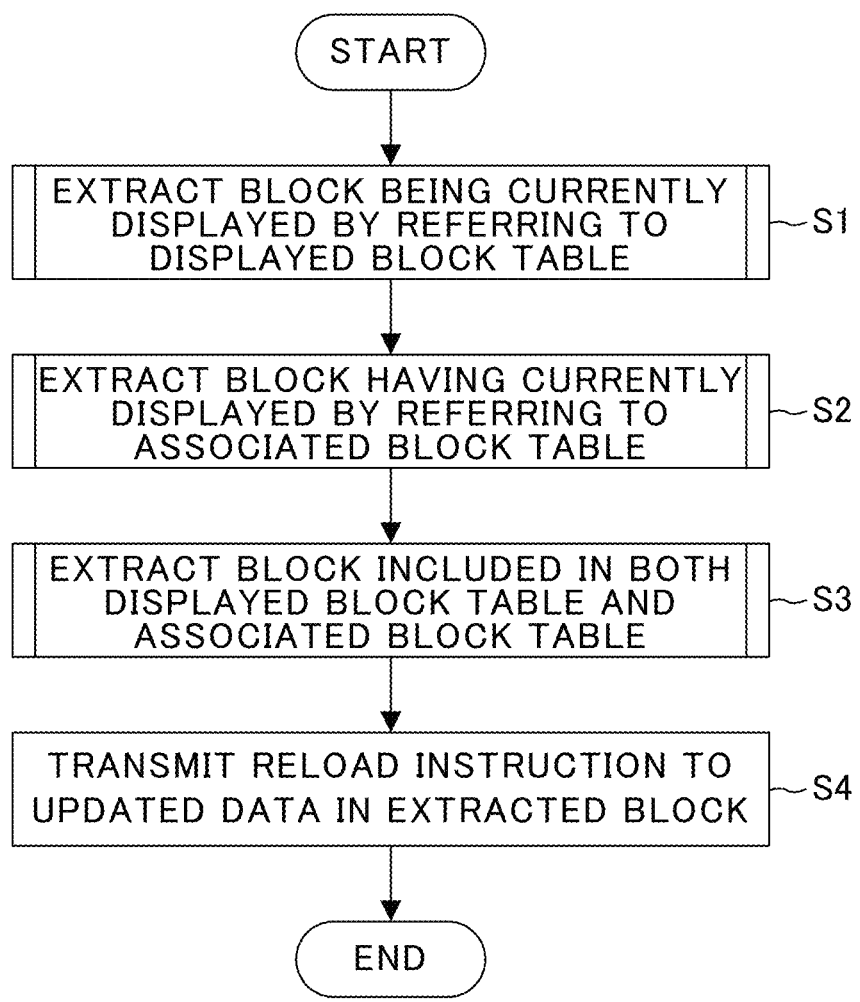
FIG. 14 is a flow diagram illustrating an example of a succession of procedural steps of a screen updating process on the sever side of FIG. 9.

Description will now be made in relation to an example of the screen updating process on the server side 10 illustrated in FIG. 9 with reference to the flow diagram (Steps S1-S4) of FIG. 14.

The instruction generator 112 extracts display blocks currently being displayed by referring to the displayed block table 142 (Step S1). The detailed process of Step S1 will be described below with reference to FIG. 15.

The instruction generator 112 extracts one or more blocks having a dependent relationship with the block updated in the DB 140 by referring to the associated block table 141 (Step S2). The detailed process of Step S2 will be described below with reference to FIG. 16.

The instruction generator 112 extracts one or more blocks included in both the displayed block table 142 and the associated block table 141 (Step S3). The detailed process of Step S3 will be described below with reference to FIG. 17.

The instruction transmitter 113 transmits a reload instruction on the data updated in each extracted block to the client terminal 2 (Step S4). Then the process is terminated.

Next, detailed description will now be made in relation to the displayed block extracting process (Step S1) illustrated in FIG. 14 with reference to the flow diagram (Steps S11 and S12) of FIG. 15.

The instruction generator 112 obtains information of one or more blocks currently being displayed from the "BLOCK" column of the displayed block table 142 (step S11).

The instruction generator 112 generates a displayed block list collecting the blocks currently being displayed, which are candidates for the update, on the basis of the obtained information of the blocks (Step S12). Then the displayed block extracting process terminates.

Next, detailed description will now be made in relation to the extracting process of an associated block (Step S2) illustrated in FIG. 14 with reference to the flow diagram (Steps S21-S23) of FIG. 16.

The instruction generator 112 retrieves a record of the block updated in the DB 140 from the "BLOCK" column of the associated block table 141 (Step S21).

The instruction generator 112 refers to the "associated block" column of the associated block table 141 (Step S22).

The instruction generator 112 generates an associated block list collectively listing associated blocks, which are candidates for the update (Step S23), and then the associated block extracting process of an associated block terminates.

Figure 17:
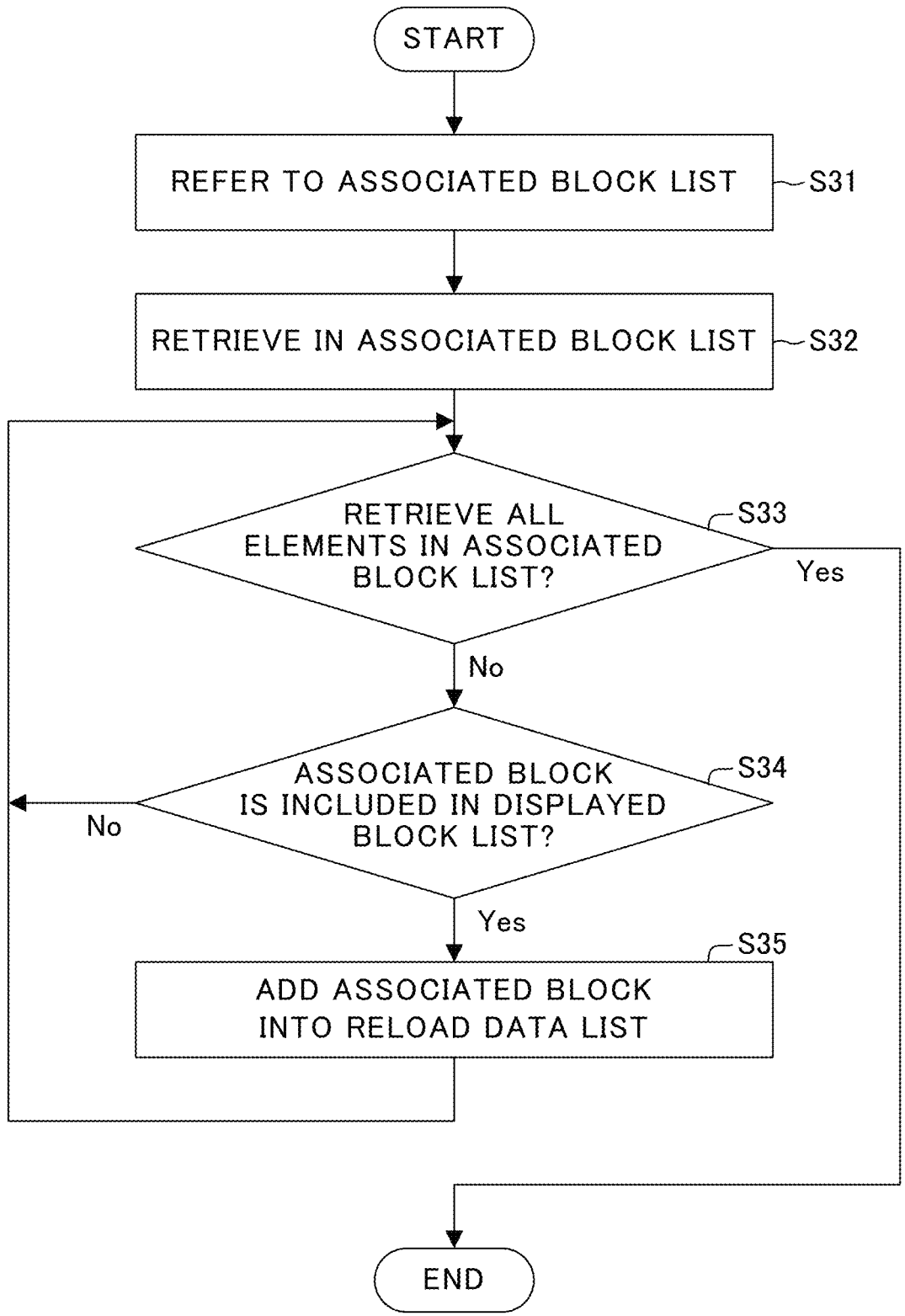
FIG. 17 is a flow diagram illustrating a succession of detailed procedural steps of an extracting process of an updating target block of FIG. 14.

Next, detailed description will now be made in relation to an extracting process of an updating target block (Step S3) in FIG. 14 with reference to the flow diagram (Steps S31-S35) of FIG. 17.

Figure 16:
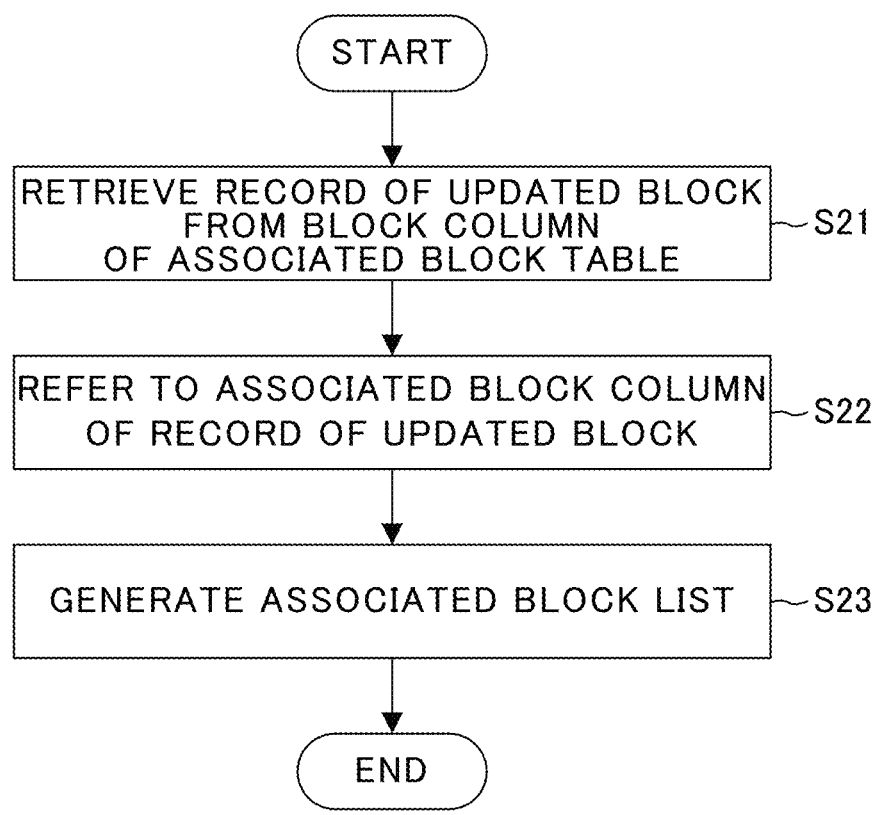
FIG. 16 is a flow diagram illustrating a succession of detailed procedural steps of an associated block extracting process of FIG. 14.

The instruction generator 112 refers to the associated block list generated in Step S3 of FIG. 16 (Step S31).

The instruction generator 112 retrieves an update target block from the associated block list (Step S32).

The instruction generator 112 determines whether all the elements in the associated block list have been retrieved (Step S33).

In cases where all the elements in the associated block list have been retrieved (see YES route in Step S33), the extracting process of an updating target block terminates.

Figure 15:
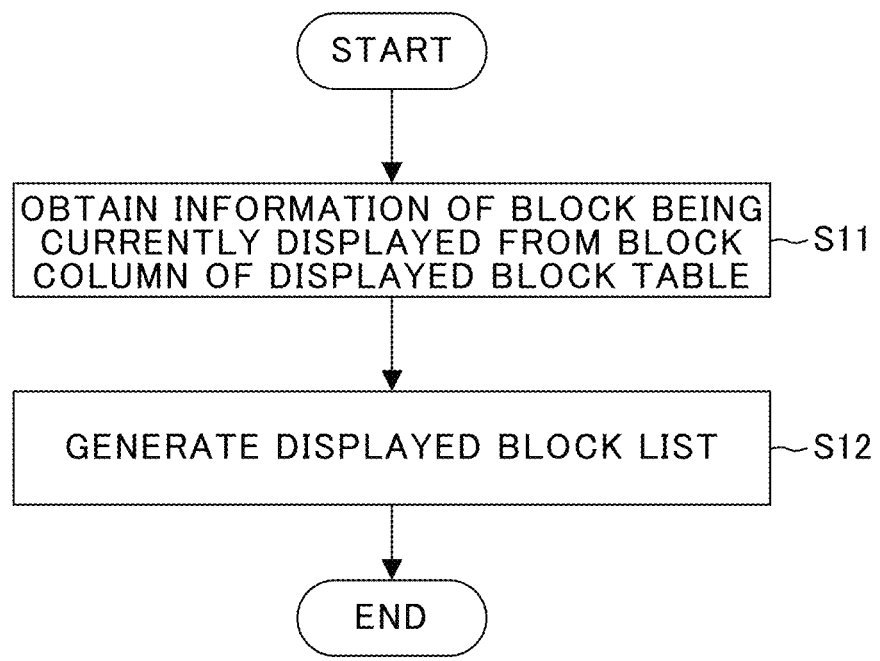
FIG. 15 is a flow diagram illustrating a detailed succession of detailed procedural steps of a displayed block extracting process of FIG. 14.

On the other hand, in cases where not all the elements in the associated block list have been retrieved (see NO route in Step S33), the instruction generator 112 determines whether the retrieved associated block is included the displayed block list generated in Step S2 of FIG. 15 (Step S34).

In cases where the associated block is not included in the displayed block list (see No route of Step S34), the process returns to Step S33.

In contrast, in cases where the associated block is included in the displayed list (see Yes route in Step S34), the retrieved associated block is added to the reload data list indicative of the contents of data to be updated, and the process returns to Step S33.

FIG. 18 is a diagram illustrating an example of the reload data list in the screen displaying system 100 of FIG. 3.

In the reload data list of FIG. 18, "DATA ID" represents an identifier of the data; "TARGET BLOCK" represents the block in which reload target data exists; and "DB OPERATION" represents the type of reload, which is one among generation, update, and deletion of data. The "DATA ATTRIBUTES #1-# n" register therein data contents that a record associated with the data ID has.

In the example of FIG. 18, a reload instruction on "DATA ID" of "1" has a "TARGET BLOCK" of the blocks B and C; a "DB OPERATION" of "update"; and "DATA ATTRIBUTES #1-# n" are "Value 1" to "value n", respectively.

Figure 19:
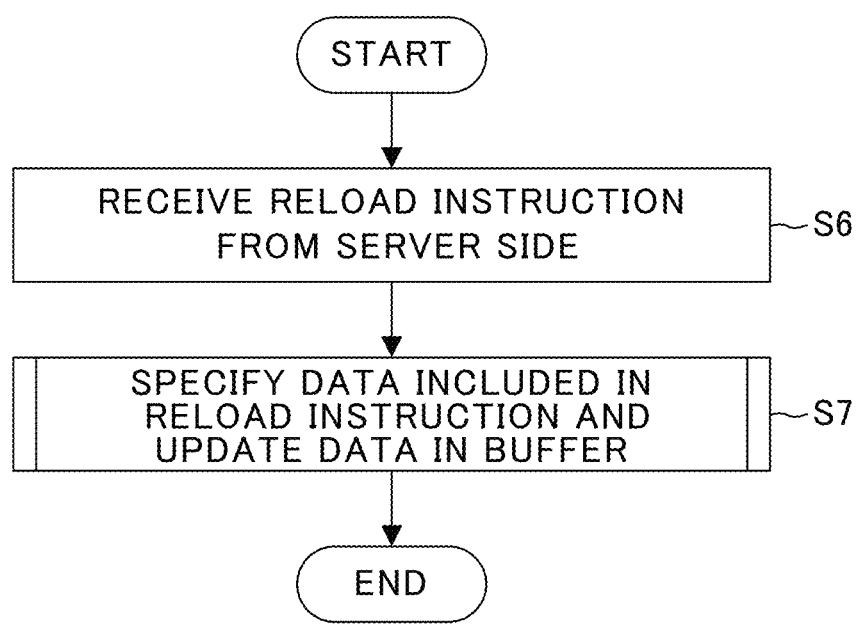
FIG. 19 is a flow diagram illustrating an example of a succession of procedural steps of a screen updating process on the client side of FIG. 10.

Next, description will now be made in relation to an example of a screen updating process on the client side 20 of FIG. 10 with reference to the flow diagram (Steps S6 and S7) of FIG. 19.

The instruction receiver 211 receives a reload instruction from the server side 10 (Step S6).

The instruction analyzer 212 specifies data included in the reload instruction, and updates data in the displayed data buffer 203 (Step S7), and then the process terminates.

Figure 20:
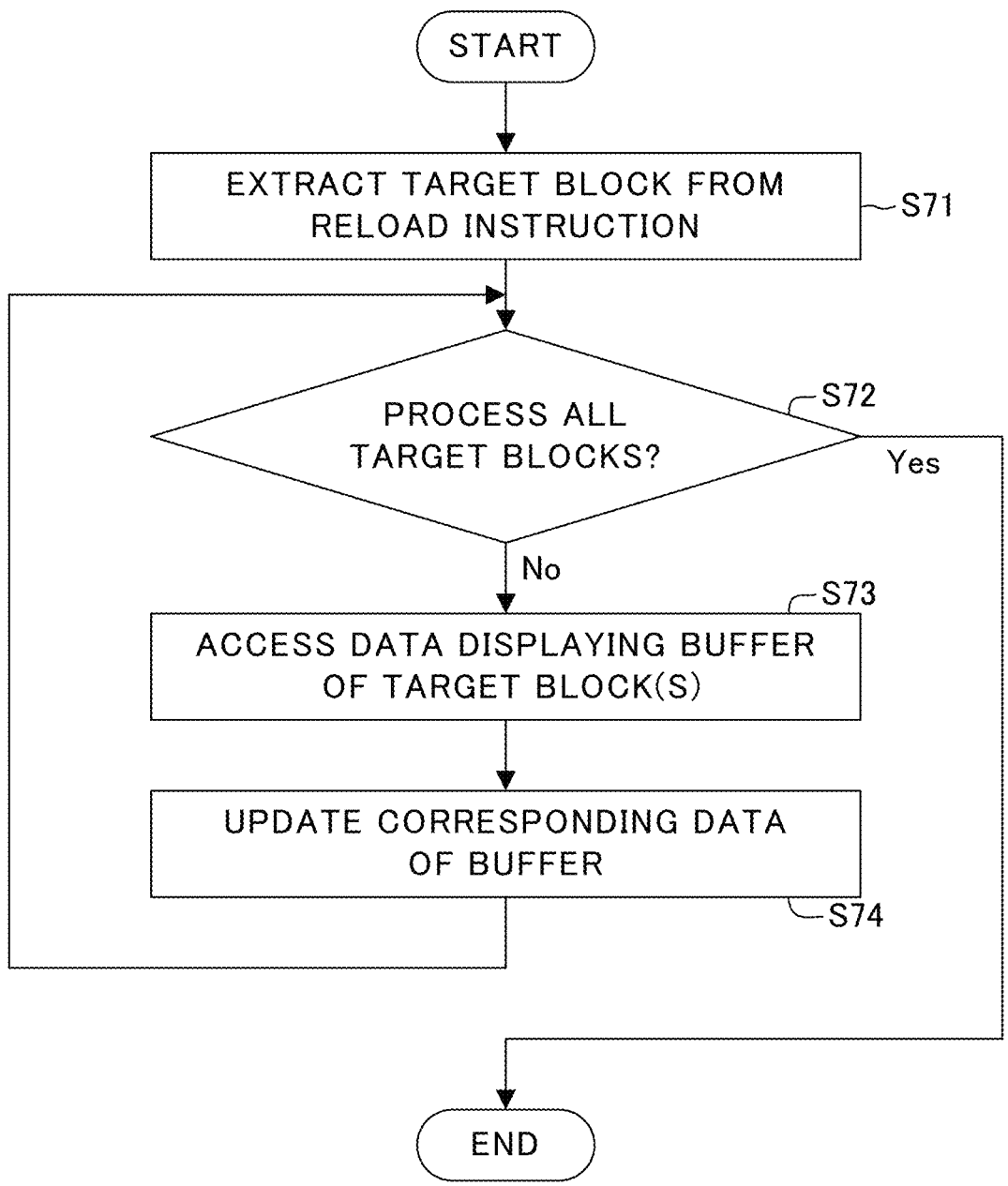
FIG. 20 is a flow diagram illustrating a succession of detailed procedural steps of a screen updating process of FIG. 19.

Next, detailed description will now be made in relation to a screen updating process (Step S7) illustrated in FIG. 19 with reference to the flow diagram (Steps S71-S74) of FIG. 20.

The instruction analyzer 212 extracts a target block from a reload instruction (Step S71).

The instruction analyzer 212 determines whether the instruction analyzer 212 has processed all the target blocks (Step S72).

In cases where the instruction analyzer 212 has processed all the target blocks (see Yes route in Step S72), the screen updating process terminates.

In contrast, in cases where the instruction analyzer 212 has processed not all the target blocks (see No route in Step S72), the instruction analyzer 212 accesses the displayed data buffer 203 of the target block (step S73).

The instruction analyzer 212 updates the corresponding data in the displayed data buffer 203 (step S74), and the process returns to Step S74.

(A-3) Effects

The screen displaying system 100 of an example of the above embodiment brings the following effects, for example.

The storing device 14 stores the associated segment information indicative of two or more blocks having common data forming the display contents among multiple blocks included in the screen of the client terminal 2. In cases where an update of data occurs in the first block, the instruction generator 112 and the instruction transmitter 113 instruct the client terminal 2 to update data forming the display contents to be displayed on the second block associated with the first block with reference to the associated segment information.

Thereby, data of the display screen can be efficiently updated. Since the update is carried out on only the record of the data to be updated, the amount of I/O access can be reduced as compared with a case where each block is updated. Furthermore, since an update is carried out on a block associated with the block updated in the DB 140, it is possible to prevent data inconsistency between the blocks from occurring.

The storing device 14 further stores display segment information indicative of one or more blocks being displayed on the screen among the multiple blocks. On the basis of the display segment information, the instruction generator 112 and the instruction transmitter 113 instruct the client terminal 2 to update the data forming the display contents on the second block being displayed on the screen.

Thereby, instruction to update data is directed only to the block being displayed on the screen on the client terminal 2, so that the amount of I/O access can be further reduced.

In cases where a third block is newly displayed on the screen and the data forming the display contents on the third display unit segment is the same as the data forming the display contents on the first display unit segment by reference to the associated segment information, the instruction generator 112 and the instruction transmitter 113 instruct the client terminal 2 to update the data forming the display contents to be displayed on the third block.

This prevents data inconsistency between the blocks from occurring even when screen transition occurs in the client terminal 2.

In cases where an update to delete a part of data occurs on the second block, the instruction transmitter 113 transmits data forming the display contents to be newly displayed on the second block to the client terminal 2.

For example, even if a part of data is to be deleted from a list having a predetermined number of data pieces to be displayed on the screen of the client terminal 2, the new data piece can be replenished into the list.

(B) Miscellaneous

The disclosed technique is not limited to the above embodiment and can be variously changed or modified without departing from the scope of the present embodiment. The configurations and processes of the present embodiment can be selected, omitted, or appropriately combined according to the requirement.

According one aspect, data on the display screen can be efficiently updated.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An information processing apparatus connected to a client terminal, the information processing apparatus comprising:
   a storing device configured to store associated segment information indicative of two or more display unit segments having common data forming display contents among a plurality of display unit segments included in a screen of the client terminal; and
   a processor configured to instruct, when an update occurs on data forming the display contents on a first display unit segment among the plurality of display unit segments, the client terminal to update data forming the display contents to be displayed on a second display unit segment associated with the first display unit segment among the plurality of display unit segments by referring to the associated segment information stored in the storing device.

2. The information processing apparatus according to claim 1, wherein:
   the storing device further stores display segment information indicative of one or more display unit segments being displayed on the screen among the plurality of display unit segments; and
   the processor instructs the client terminal to update the data forming the display contents on the second display unit segment being displayed on the screen by referring to the display segment information stored in the storing device.

3. The information processing apparatus according to claim 1, wherein when a third display unit segment among the plurality of display unit segments is newly displayed on the screen and when data forming the display contents on the third display unit segment is the same as the data forming the display contents on the first display unit segment by reference to the associated segment information stored in the storing device, the processor instructs the client terminal to update the data forming the display contents to be displayed on the third display unit segment.

4. The information processing apparatus according to claim 1, wherein when updating a part of data that is to be deleted occurs on the second display unit segment, the processor transmits data forming the display contents to be newly displayed on the second display unit segment to the client terminal.

5. A screen displaying system comprising:
   an information processing apparatus and a client terminal, the information processing apparatus comprising
      a storing device configured to store associated segment information indicative of two or more display unit segments having common data forming display contents among a plurality of display unit segments included in a screen of the client terminal, and
      a first processor configured to instruct, when an update occurs in data forming the display contents on a first display unit segment among the plurality of display unit segments, the client terminal to update data forming the display contents to be displayed on a second display unit segment associated with the first display unit segment among the plurality of display unit segments by referring to the associated segment information stored in the storing device; and
   the client terminal comprising
      a display unit configured to display thereon the screen, and
      a second processor configured to update, in the display unit, display of the data forming the display contents on the second display unit segment in addition to updating of the data forming the display contents to be displayed on the first display unit segment in response to the instructing of the first processor.

6. The screen displaying system according to claim 5, wherein:
   the storing device further stores display segment information indicative of one or more display unit segments being displayed on the screen among the plurality of display unit segments;
   the first processor instructs the client terminal to update the data forming the display contents on the second display unit segment being displayed on the screen by referring to the display segment information stored in the storing device; and
   the second processor updates, in the display unit, the display of the data forming the display contents on the second display unit segment being displayed on the screen in response to the instructing of the first processor.

7. The screen displaying system according to claim 5, wherein when a third display unit segment among the plurality of display unit segments is newly displayed on the screen and when data forming the display contents to be displayed on the third display unit segment is the same as the data forming the display contents on the first display unit segment by reference to the associated segment information stored in the storing device, the first processor instructs the client terminal to update the data forming the display contents to be displayed on the third display unit segment; and the second processor updates, in the display unit, the display of the data forming the display contents to be displayed on the third display unit segment in response to the instructing of the first processor.

8. The screen displaying system according to claim 5, wherein
   when updating a part of data that is to be deleted occurs on the second display unit segment, the first processor transmits data forming the display contents to be newly displayed on the second display unit segment to the client terminal; and the second processor deletes the part of the data on the second display unit segment and displays, on the second display unit segment, the data forming the display contents to be newly displayed that is transmitted from the first processor.

9. A non-transitory computer-readable recording medium having stored therein a program that causes a computer included in an information processing apparatus connected to a client terminal to execute a method comprising:

storing associated segment information indicative of two or more display unit segments having common data forming display contents among a plurality of display unit segments included in a screen of the client terminal; and instructing, when an update occurs on data forming the display contents on a first display unit segment among the plurality of display unit segments, the client terminal to update data forming the display contents to be displayed on a second display unit segment associated with the first display unit segment among the plurality of display unit segments by referring to the associated segment information stored in the storing device.

10. The non-transitory computer-readable recording medium according to claim 9, wherein the program further instructs the computer to execute:

further storing display segment information indicative of one or more display unit segments being displayed on the screen among the plurality of display unit segments; and instructing the client terminal to update the data forming the display contents on the second display unit segment being displayed on the screen by referring to the display segment information being stored.

11. The non-transitory computer-readable recording medium according to claim 9, wherein the program further instructs the computer to execute:

when a third display unit segment among the plurality of display unit segments is newly displayed on the screen and when data forming the display contents on the third display unit segment is the same as the data forming the display contents on the first display unit segment by referring to the associated segment information being stored, instructing the client terminal to update the data forming the display contents to be displayed on the third display unit segment.

12. The non-transitory computer-readable recording medium according to claim 9, wherein the program further instructs the computer to execute:

when updating a part of data that is to be deleted occurs on the second display unit segment, transmitting data forming the display contents to be newly displayed on the second display unit segment to the client terminal.

13. A non-transitory computer-readable recording medium having stored therein a program that causes a computer included in a client terminal connected to an information processing apparatus to execute a method comprising:

when an update occurs on data forming display contents on a first display unit segment among a plurality of display unit segments, receiving a first instruction to update data forming the display contents to be displayed on a second display unit segment associated with the first display unit segment among the plurality of display unit segments from the information processing apparatus, the first instruction being based on associated segment information indicative of two or more display unit segments having common data forming the display contents among the plurality of display unit segments; and updating display of the data forming the display contents to be displayed on the second display unit segment in addition to updating of the data forming the display contents on the first display unit segment in response to the first instruction.

14. The non-transitory computer-readable recording medium according to claim 13, wherein the program further instructs the computer to execute: receiving, from the information processing apparatus, the first instruction to update the data forming the display contents to be displayed on the second display unit segment being displayed on the screen, the first instruction being based on display segment information indicative of one or more display unit segments being displayed on the screen among the plurality of display unit segments; and updating the data forming the display contents to be displayed on the second display unit segment being displayed on the screen in response to the first instruction.

15. The non-transitory computer-readable recording medium according to claim 13, wherein the program further instructs the computer to execute:

when a third display unit segment among the plurality of display unit segments is newly displayed on the screen and when data forming the display contents on the third display unit segment is the same as the data forming the display contents on the first display unit segment by reference to the associated segment information being stored, receiving a second instruction to update the data forming the display contents to be displayed on the third display unit segment from the information processing apparatus; and updating the display of the data forming the display contents to be displayed on the third display unit segment in response to the second instruction.

16. The non-transitory computer-readable recording medium according to claim 13, wherein the program further instructs the computer to execute:

when updating a part of data that is to be deleted occurs on the second display unit segment, receiving data forming the display contents to be newly displayed on the second display unit segment from the information processing apparatus; and displaying, on the second display unit segment, the data forming the display contents to be newly displayed.

* * * * *